United States Patent [19]
Taguchi et al.

[11] Patent Number: 5,378,273
[45] Date of Patent: Jan. 3, 1995

[54] BASE PLATE CONVEYOR

[75] Inventors: Hiroshi Taguchi; Yoji Washizaki; Akira Igarashi, all of Tokyo; Hiroyoshi Nakano, Saitama, all of Japan

[73] Assignee: Somar Corporation, Tokyo, Japan

[21] Appl. No.: 96,830

[22] Filed: Jul. 26, 1993

Related U.S. Application Data

[63] Continuation of Ser. No. 690,185, Apr. 19, 1991, abandoned.

[30] Foreign Application Priority Data

Jun. 1, 1990 [JP] Japan .................. 2-143522

[51] Int. Cl.$^6$ ............................. B32B 31/00
[52] U.S. Cl. ............................. 156/362; 156/521; 198/456; 271/227
[58] Field of Search ............ 156/350, 362, 363, 364, 156/521, 522; 226/20, 21, 22; 198/444, 449, 452, 456; 271/227

[56] References Cited

U.S. PATENT DOCUMENTS

| | | | |
|---|---|---|---|
| 2,815,111 | 12/1957 | Capps et al. | 198/29 |
| 3,301,455 | 1/1967 | Gibson | 226/17 |
| 4,828,247 | 5/1989 | Matsuo et al. | 271/240 |
| 5,010,999 | 4/1991 | Candore | 198/456 |

FOREIGN PATENT DOCUMENTS 3420431 12/1985 Germany .

OTHER PUBLICATIONS

German Patent Office Action "Dubbel, Taschenbuch fuür den Maschinenbau", 13. Auflage; 2. Band; Berlin, Heidelberg, New York 1970; Springer-Verlag; S. 723, 724.

Primary Examiner—Michael W. Ball
Assistant Examiner—J. Sells
Attorney, Agent, or Firm—Sughrue, Mion, Zinn, Macpeak & Seas

[57] ABSTRACT

A base plate conveyor includes conveyance rollers for conveying a base plate to a prescribed position, and a base plate centering mechanism having right and left centerers for centering said base plate on said base plate conveyor. The conveyor further includes a device for moving the right and left centerer at a prescribed speed in a direction transverse to the direction of conveyance of the base plate. The moving device moves the centerers at the prescribed speed to such a position that the distance between the right and left centerers is slightly larger than a width of the base plate. The moving device thereafter moves the right and left centerers toward the base plate at a speed lower than the prescribed speed, such that the base plate is centered.

16 Claims, 14 Drawing Sheets

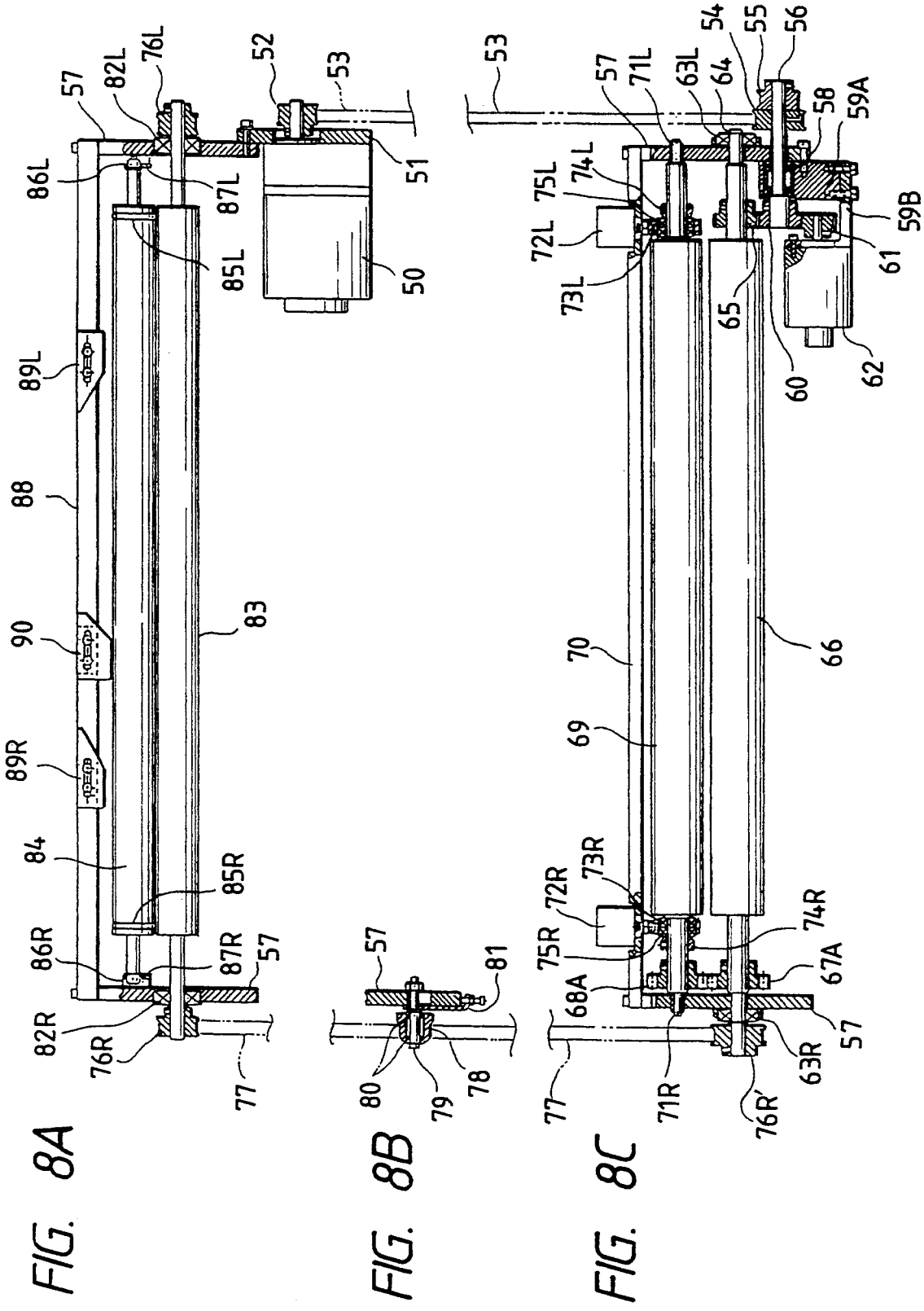

BASE PLATE CONVEYOR

This is a continuation of application Ser. No. 07/690,185 filed Apr. 19, 1991 abandoned.

BACKGROUND OF THE INVENTION

The present invention relates to a base plate conveyor and a sticking apparatus, and particularly relates to a base plate conveyor having a base plate centering mechanism.

A conventional base plate conveyor having a base plate centering mechanism is used such that a base plate is conveyed and centered to be precisely and quickly processed at the various stages of a sticking apparatus while the base plate is in a trued up state. The conveyor is very important for a film sticking apparatus in particular, and performs the centering of the base plate at a fixed speed by using a guide-rail-type centerer. Since the contact resistance between the guide-rail type centerer and the side edge of the base plate is high or if the centering force of the centerer is too strong, the central portion of the base plate is buoyed up from the conveyance rollers so that the conveyance of the base plate is likely to be stopped. For this reason, a pole-type centerer whose base plate contact portion is rotatable was proposed in the Japanese Patent Application (OPI) No. 96244/87 (the term "OPI" as used herein means an "unexamined published application").

Since the conventional pole-type centerer mentioned above functions so that a fixed force is forcibly applied to a base plate during the centering thereof to push the side edge of the base plate at a point on the cylindrical peripheral surface of the centerer, there is a problem in that the base plate is likely to be curled or damaged at the side edge thereof if the thickness of the plate is small.

SUMMARY OF THE INVENTION

The present invention was made in order to solve the above-noted problem. Accordingly, it is an object of the present invention to provide a centering mechanism in which a base plate is prevented from being curled or being damaged at the side edge thereof, due to the pushing of the side edge of the base plate while the base plate is on the base plate conveyor of a sticking apparatus or the like.

The above-mentioned object and other objects and novel features of the present invention will be apparent from the description herein and the drawings attached hereto.

A base plate conveyor provided in accordance with the present invention so as to solve the abovementioned problem includes conveyance rollers for conveying a base plate to a prescribed position, and a base plate centering mechanism. The base plate conveyor further includes a base plate centerer moving means for moving the right and/or left centerer of the base plate centering mechanism at a prescribed speed in a direction crossing (i.e., transverse) with that of the conveyance of the base plate, the moving means moving the right and/or left centerer at the prescribed speed to such a position that the distance between the right and the left centerers is slightly larger than the width of the base plate, and the moving means thereafter moving the right and/or left centerer at a speed lower than the prescribed speed. The base plate conveyor has another feature in that it has a means for temporarily stopping the movement of the right and/or left centerer at the time when, or at the place where, the movement is slowed. The base plate conveyor has yet another feature in that it includes a guide member for restricting the warpage of the base plate.

In the base plate conveyor provided in accordance with the present invention, the right and/or left centerer of the base plate centering mechanism is moved at the prescribed speed by the base plate centerer moving means, to such a position that the distance between the right and the left centerers is slightly larger than the width of the conveyed base plate. The right and/or left centerer is thereafter moved, by the other means, at the speed lower than the prescribed speed. For this reason, the base plate is prevented from being curled or damaged at the side edge thereof, due to the pushing of the plate at the side edge, regardless of the thickness of the base plate.

As described above, in the first step of the centering operation of the base plate centering mechanism, the right and/or left centerer is moved at the prescribed speed in the direction substantially perpendicular to that of the conveyance of the base plate, to such a position that the distance between the right and the left centerers is slightly larger than the width of the conveyed base plate. In this position, the centerer is or may be temporarily stopped. In the second step of the centering operation, the centerer is moved at the other speed, which is lower than the former, so that the base plate is centered. Thus, the speed of the movement of the centerer is not made lower during the entire centering operation, and it is rendered much less likely that the base plate is curled or damaged at the side edge thereof. Since the guide member for restricting the warpage of the base plate is provided over the conveyance roller, the base plate is precisely and easily centered, almost without any warping. Since the poles of the centerers are rotatably supported, the base plate can be centered without stopping the conveyance of the base plate. Since the poles can be swung down, a number of the poles, which is appropriate to the length of the base plate, can be used for the centering. For this reason, the interval between the base plates in the direction of the conveyance thereof can be shortened to enhance the efficiency of production.

BRIEF DESCRIPTION OF THE DRAWINGS

FIG. 8A is a partially sectional view of the conveyor along a line S—S shown in FIG. 3;

FIG. 8B is a view of the conveyor seen along an arrow T shown in FIG. 3;

FIG. 8C is a partially sectional view of the conveyor along a line U—U shown in FIG. 3;

DETAILED DESCRIPTION OF THE PREFERRED EMBODIMENTS

An embodiment of the present invention is hereafter described in detail with reference to the drawings attached hereto.

Figure 1:
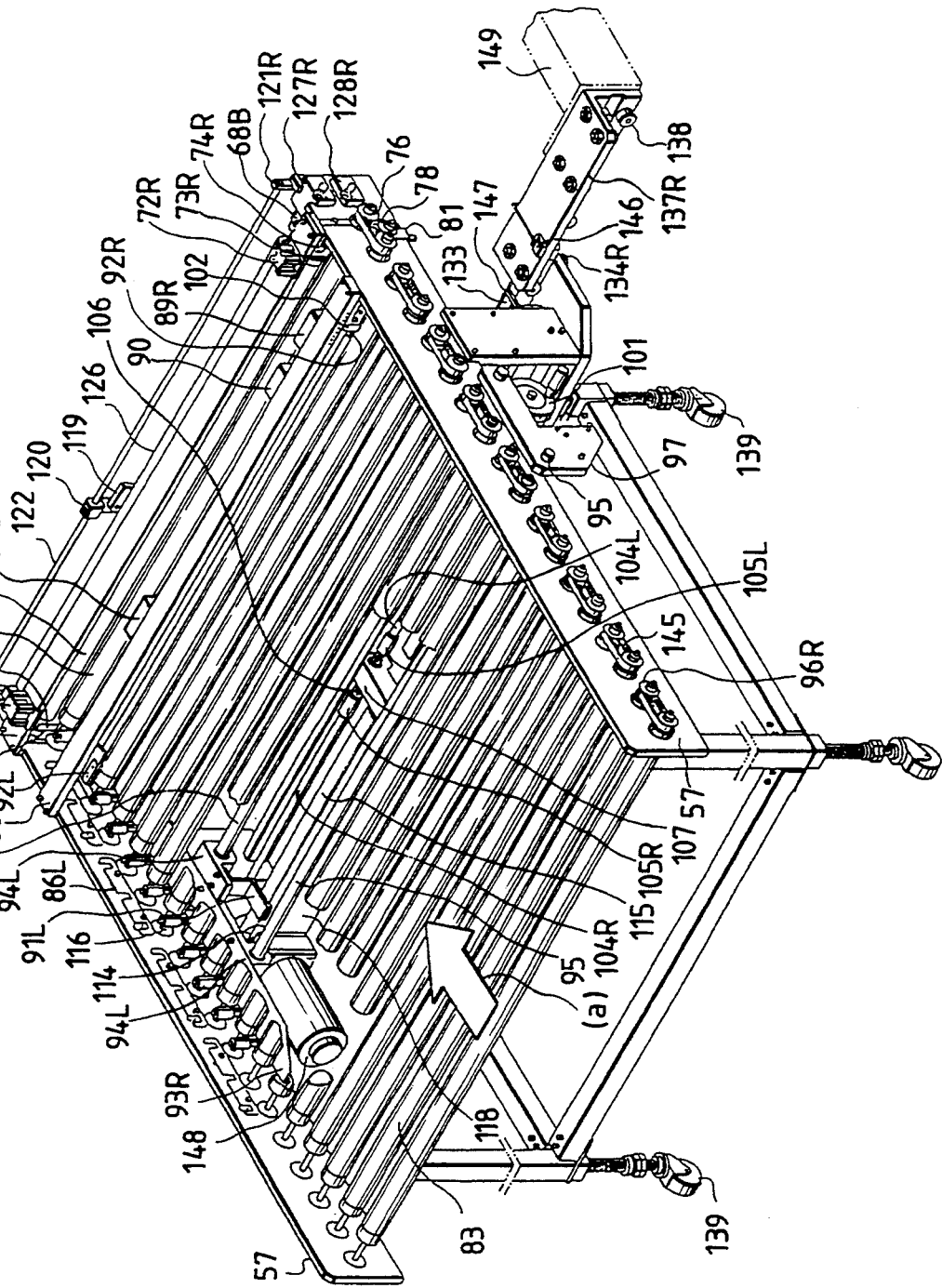
FIG. 1 is a schematic perspective view of an inlet or upstream conveyor having a centering mechanism.

FIG. 1 is a schematic perspective view of an inlet or upstream conveyor having a centering mechanism according to an embodiment of the invention and can be applied to a sticking apparatus by which stratified films, each consisting of a photosensitive resin layer and a light-transmissible resin film, are stuck, under heat and pressure, to the top and bottom of a base plate for a printed circuit board.

Figure 2:
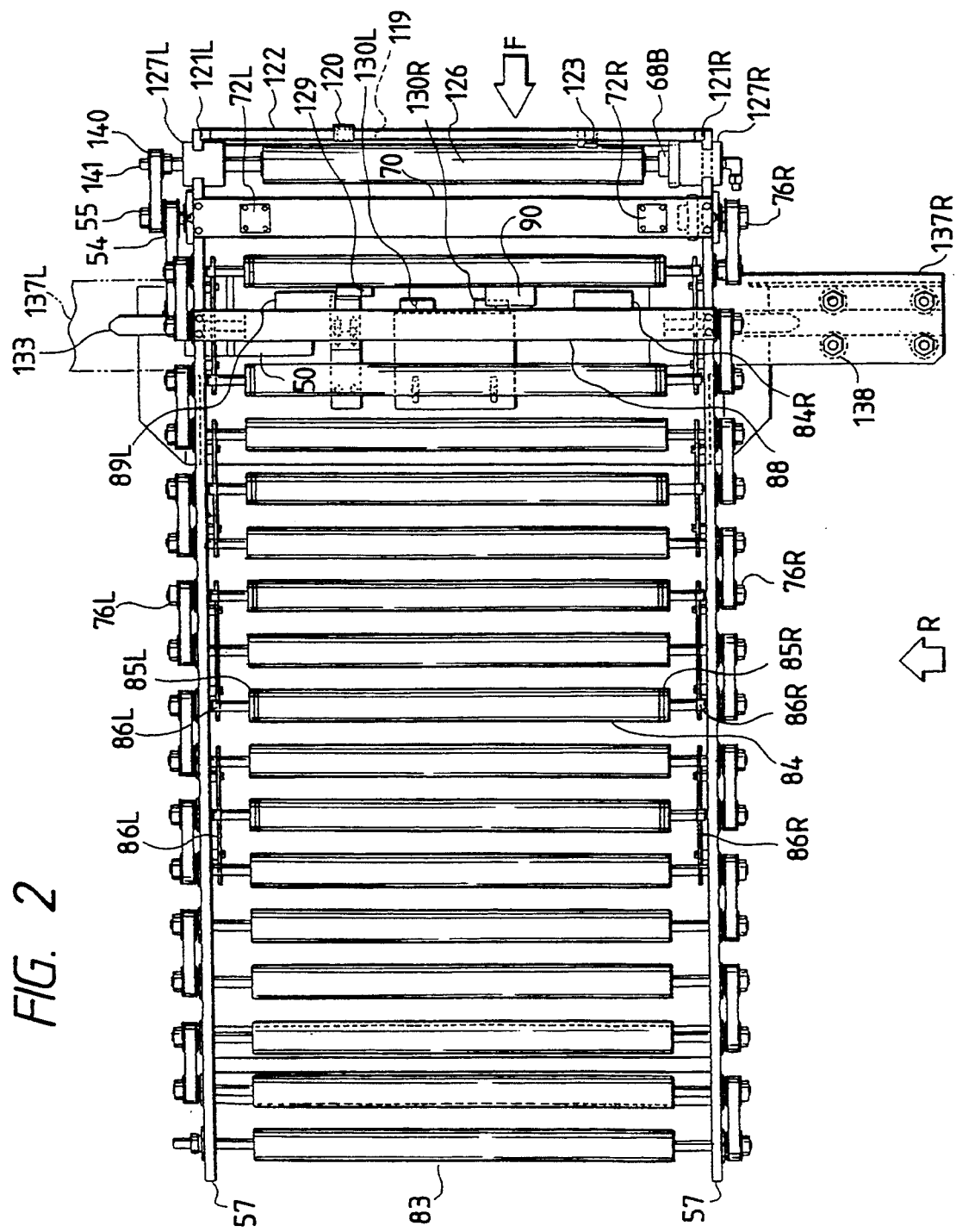
FIG. 2 is a plan view of the conveyor.
Figure 7:
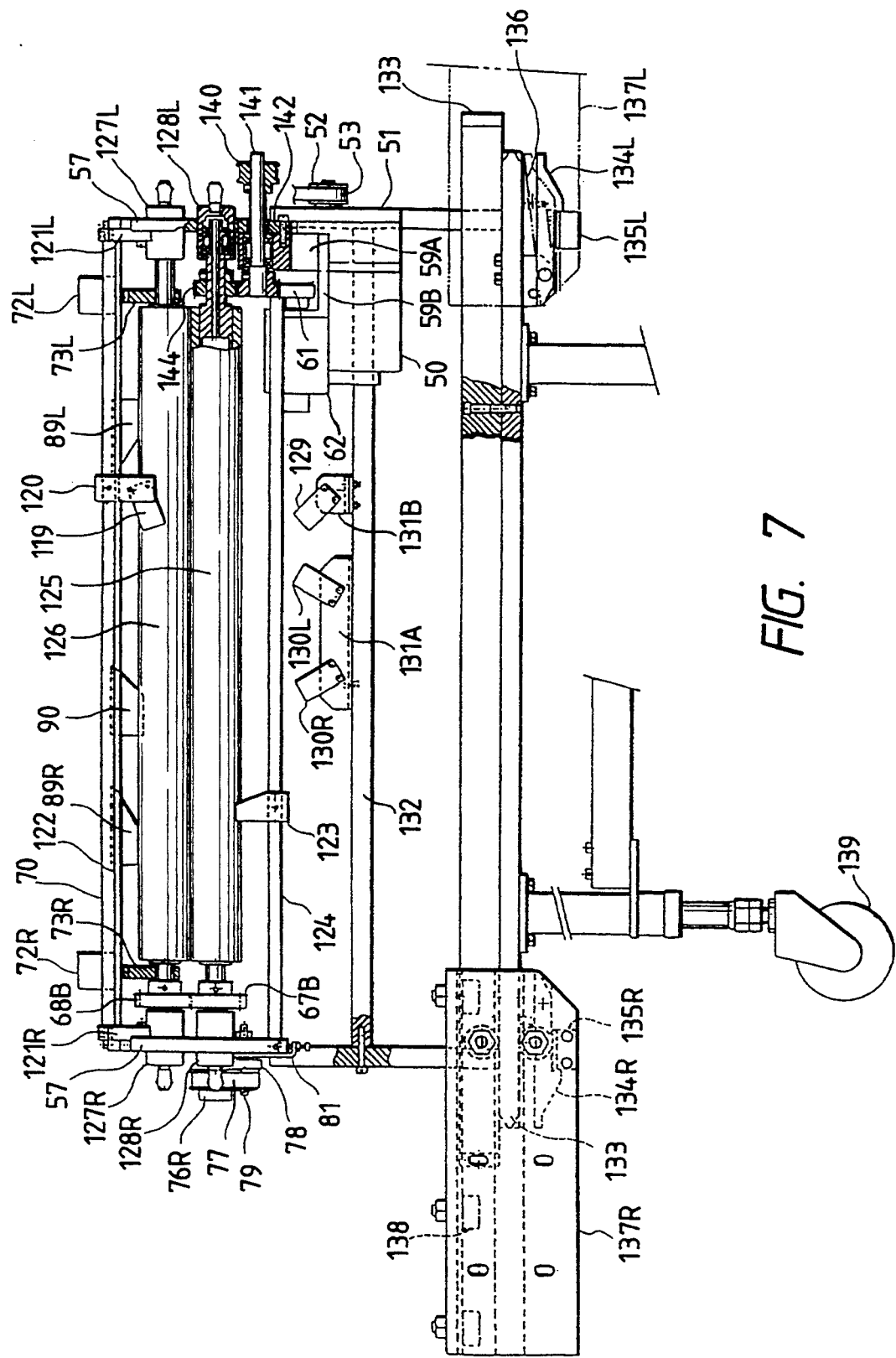
FIG. 7 is a cutaway view of the conveyor seen along an arrow F shown in FIG. 2.

When all of a plurality of conveyance rollers 83 of the base plate conveyor having the centering mechanism are rotated, the base plate is conveyed in a direction shown by an arrow (a) in FIG. 1. The conveyed base plate is detected by a centering start sensor 130L or 130R shown in FIG. 2, so that the centering of the base plate is started on the basis of a detection signal from the sensor. As shown in FIG. 7, the centering start sensors 130L and 13OR are secured by screws to a sensor support member 131A which is in turn secured to a support member attaching plate 132 by screws, so that the sensors are oriented perpendicularly with respect to the direction of the conveyance of the base plate and obliquely to each other. Since the sensors 130L and 130R are photoelectric sensors of the returning reflection type, centering sensor reflection members 89L and 89R are secured to a reflection member attaching plate 88 by screws so that the optical axes of the sensors extend through the reflection members (see FIGS. 2, 3 and 8A). The sensor 130L corresponds to the reflection member 89L, while the other sensor 130R corresponds to the other reflection member 89R. Since the two sensors 130L and 130R are oriented at an oblique angle of 45 degrees to the bottom of the conveyed base plate, either of the sensors can surely detect the base plate even if the base plate is small in size and conveyed at the side edge of the conveyance passage for the plate or obliquely conveyed on the conveyor.

Figure 5:
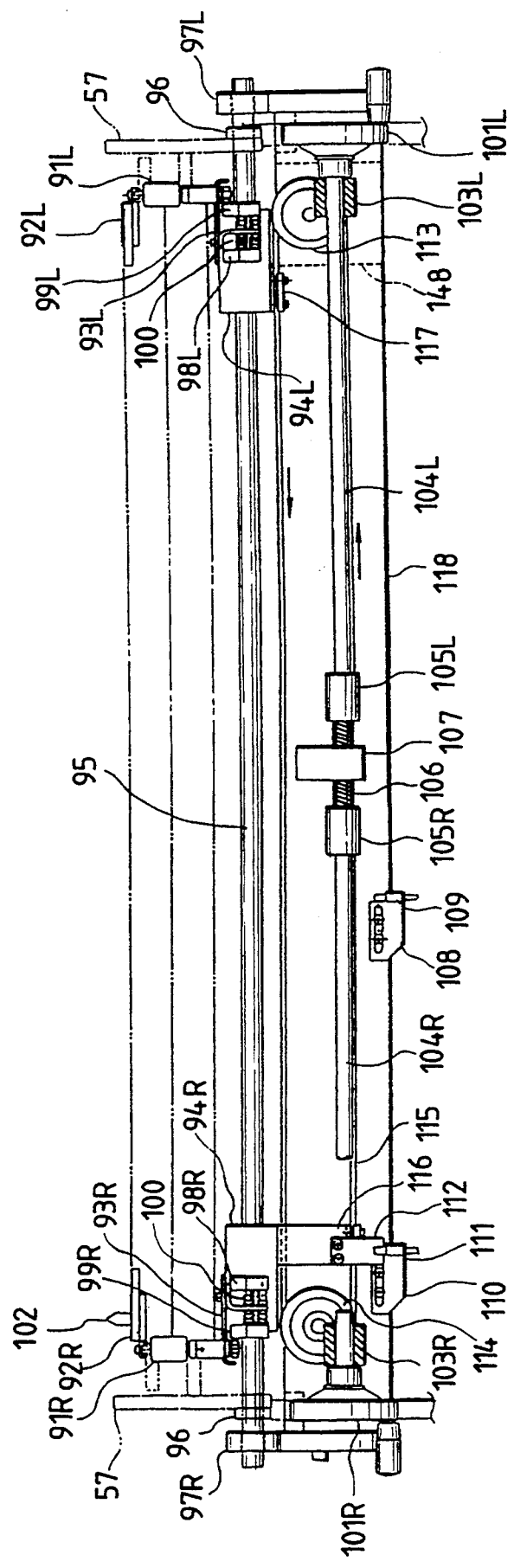
FIG. 5 is a view of the mechanism seen along arrows X shown in FIG. 4.
Figure 6:
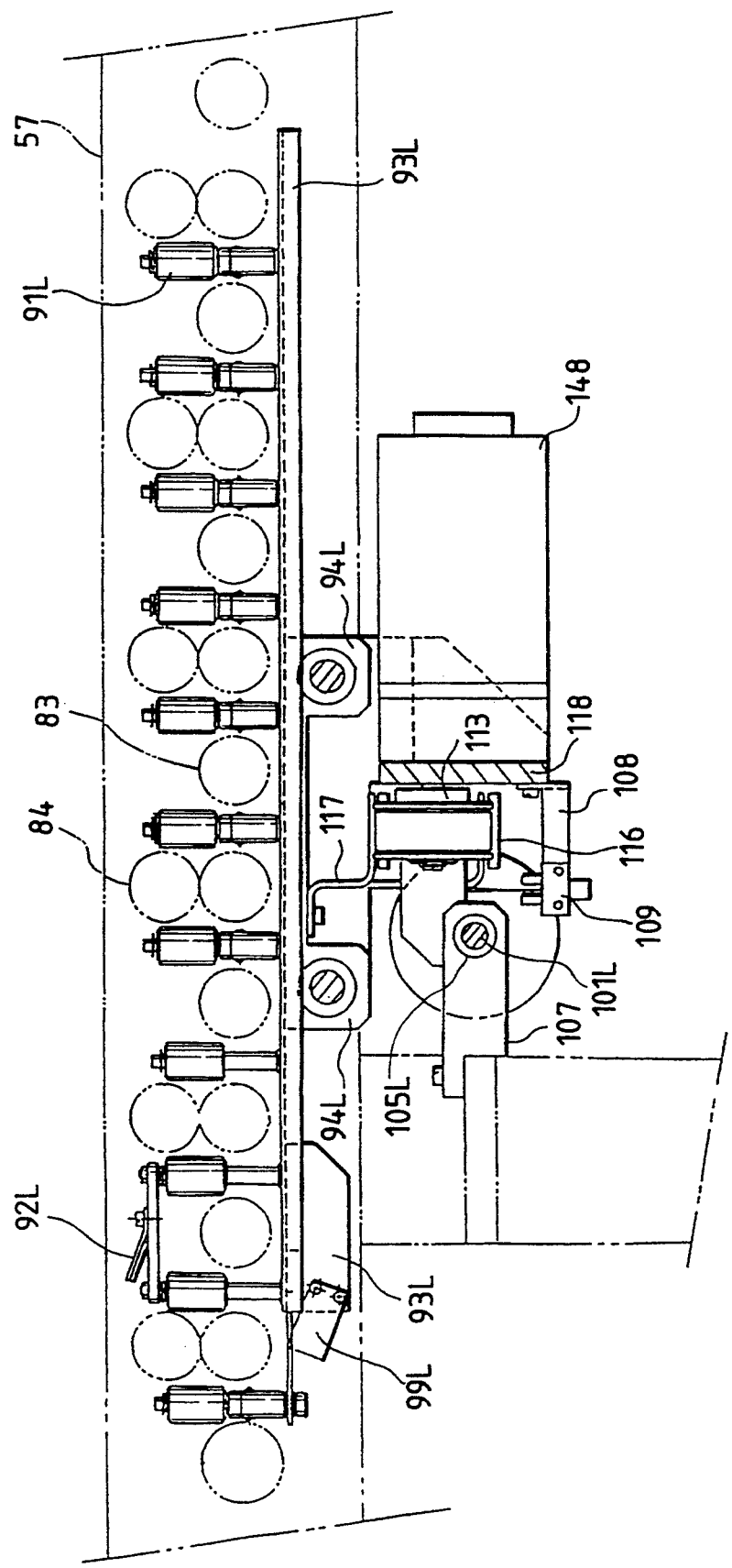
FIG. 6 is a view of the mechanism seen along arrows Y shown in FIG. 4.

As shown in FIGS. 5 and 6, the base plate centering mechanism has a centering drive motor 148 secured by screws to a centering driver support member 118 at its left end as seen in the direction of the conveyance of the base plate (or at the right end of the member with regard to FIG. 5). On the basis of the above-mentioned detection signal, the motor 148 begins to rotate at a prescribed speed counterclockwise as seen from the tip of the shaft of the motor. A pulley 113 is secured to the shaft of the motor 148 by a screw. A pulley 114 is rotatably attached to the support member 118 at its right end as seen in the direction of the conveyance of the base plate (or at the left end of the member with regard to FIG. 5). A centering member drive belt 115 is engaged on the pulleys 113 and 114. A secured member 117 is secured at one end thereof to the upper portion of the belt 115 at its left end as seen in the direction of the conveyance of the base plate (or at the right end of the belt with regard to FIG. 5), and is secured at the other end thereof to a linear bushing 94L by a screw. Another secured member 116 is secured at one end thereof to the lower portion of the belt 115 at its right end as seen in the direction of the conveyance of the base plate (or at the left end of the member with regard to FIG. 5), and is secured at the other end thereof to a linear bushing 94R by a screw. The linear bushings 94L and 94R can be slid perpendicularly with respect to direction of the conveyance of the base plate while being guided by shafts 95.

A centering pole support member 93L is secured to the upper portion of the linear bushing 94L by a screw. Another centering pole support member 93R is secured to the upper portion of the other linear bushing 94R by a screw. The centering poles 91L and 91R are attached to the support members 93L and 93R, and project from between the mutually neighboring or adjacent conveyance rollers 83 disposed at a prescribed interval, so that the poles are oriented perpendicularly to the conveyance plane for the base plate (see FIG. 6). For this reason, when the base plate conveyed on the conveyance rollers 83 is detected by the centering start sensor 130L or 130R, the centering drive motor 148 is rotated to move the belt 115 so that the linear bushings 94L and 94R secured with the secured members 116 and 117 are moved toward the center of the width of the base plate conveyance passage in the conveyor through the actions of the secured members. Both of the shafts 95 extend through shaft support members 97L and 97R and are disposed at the distance from each other and secured by the setting collars 96. Since the linear bushings 94L and 94R are moved on the two shafts 95, the centering pole support members 93L and 93R can be moved while remaining apart in parallel with each other and not swinging at the tips and butts thereof. As a result, the centering poles 91L and 91R secured to the centering pole support members 93L and 93R can precisely center the base plate.

A centering outside sensor 99L and a centering inside sensor 98L are provided under the centering pole support member 93L so that the centering outside sensor is located inside the centering pole 91L in the transverse direction of the base plate conveyor and the centering inside sensor is located inside the other sensor at a distance of about 35 mm therefrom. The senors 98L and 99L are photoelectric sensors of the returning reflection type and are set so that the axis of each of them extends through and between the adjacent conveyance rollers 83 to detect the base plate. A centering sensor reflection member 92L is secured by screws to the centering pole 91L, which is not swingable down, so that the axes of the senors 98L and 99L extend through the reflection member.

A centering outside sensor 99R and a centering inside sensor 98R are provided under the centering pole support member 93R so that the former sensor is disposed inside the centering pole 91R in the transverse direction of the base plate conveyor, and the latter sensor is located inside the former at a distance of about 35 mm therefrom. The sensors 98R and 99R are photoelectric sensors of the returning reflection type and are set so that the axis of each of them extends through and between the adjacent conveyance rollers 83 to detect the base plate. A centering sensor reflection member 92R is secured by screws to the centering pole 91R, which is not swingable down, so that the axes of the sensors 98R and 99R extend through the reflection member. A centering mechanism indication plate 102 is secured to the reflection member 92R.

Figure 9A:
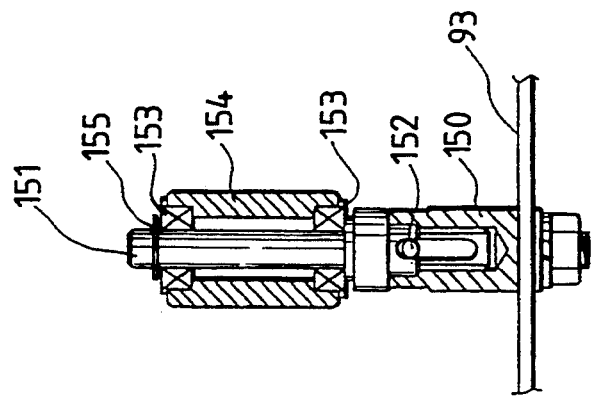
FIG. 9A is a sectional view of the centering pole of the mechanism.

As shown in FIG. 9A, a secured portion 150 of each of the centering poles 91L and 91R, which are not swingable down, is secured to the centering pole support member 93 by a nut. A shaft 151 of the pole is inserted into the secured portion 150. A rotary portion 154 of the pole is rotatably mounted on the shaft 151 via a bearing 153, and a stop ring 155 of the pole is provided on the shaft 151 at the tip thereof.

Figure 9B:
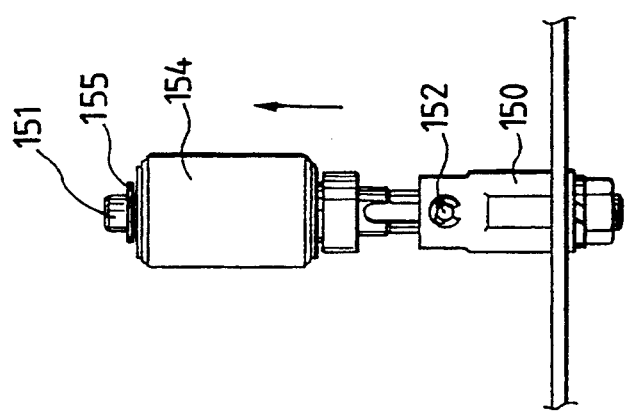
FIG. 9B is a view of the pole pulled out along an arrow shown therein.
Figure 9C:
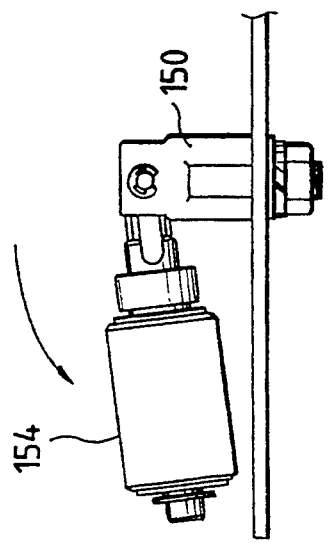
FIG. 9C is a view of the pole swung down along an arrow shown therein.
Figure 10:
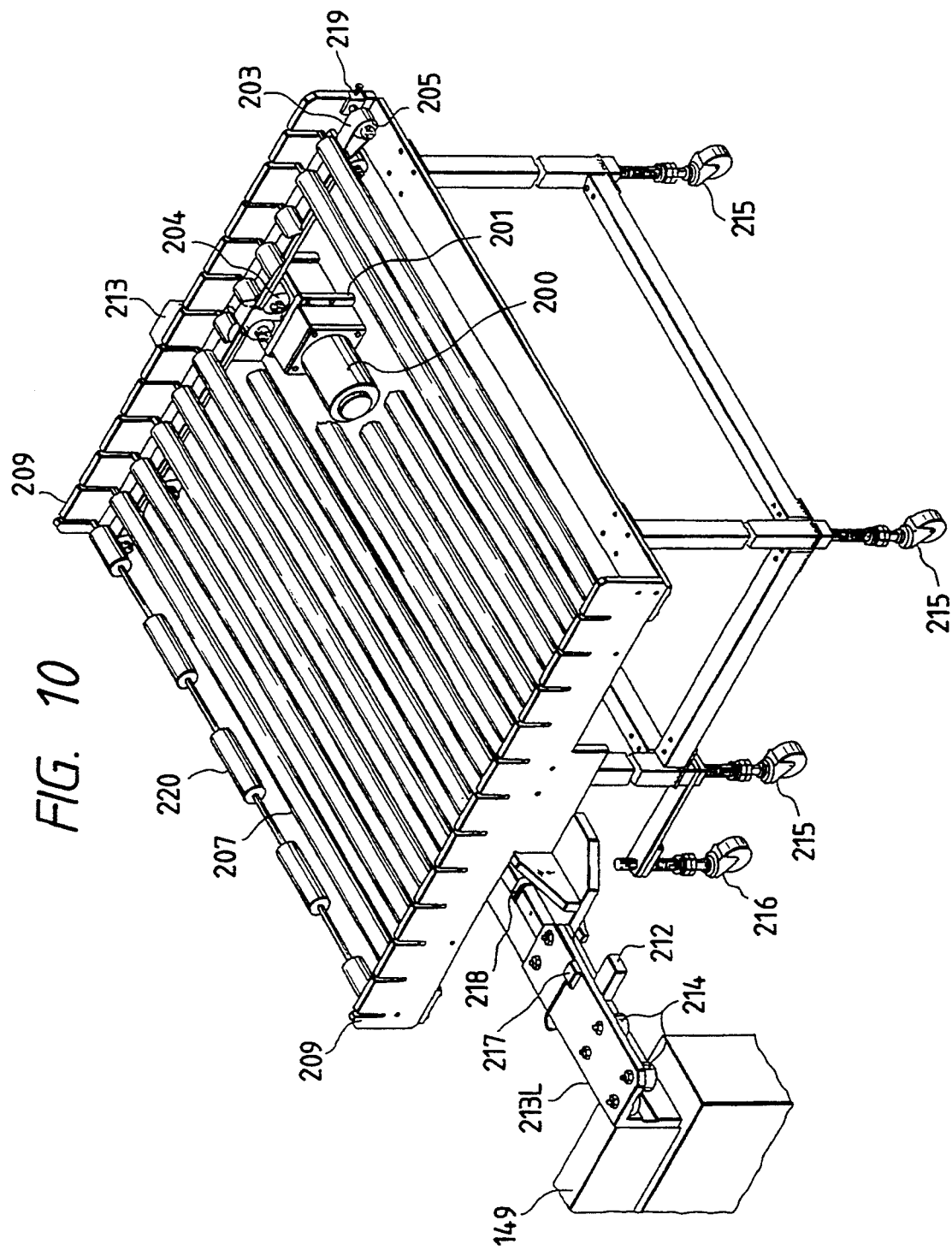
FIGS. 10, 11, 12 and 13 are explanatory figures which show an example of how a downstream base plate conveyor of the sticking apparatus can be moved either rightward or leftward and separated from the body of the apparatus.
Figure 11:
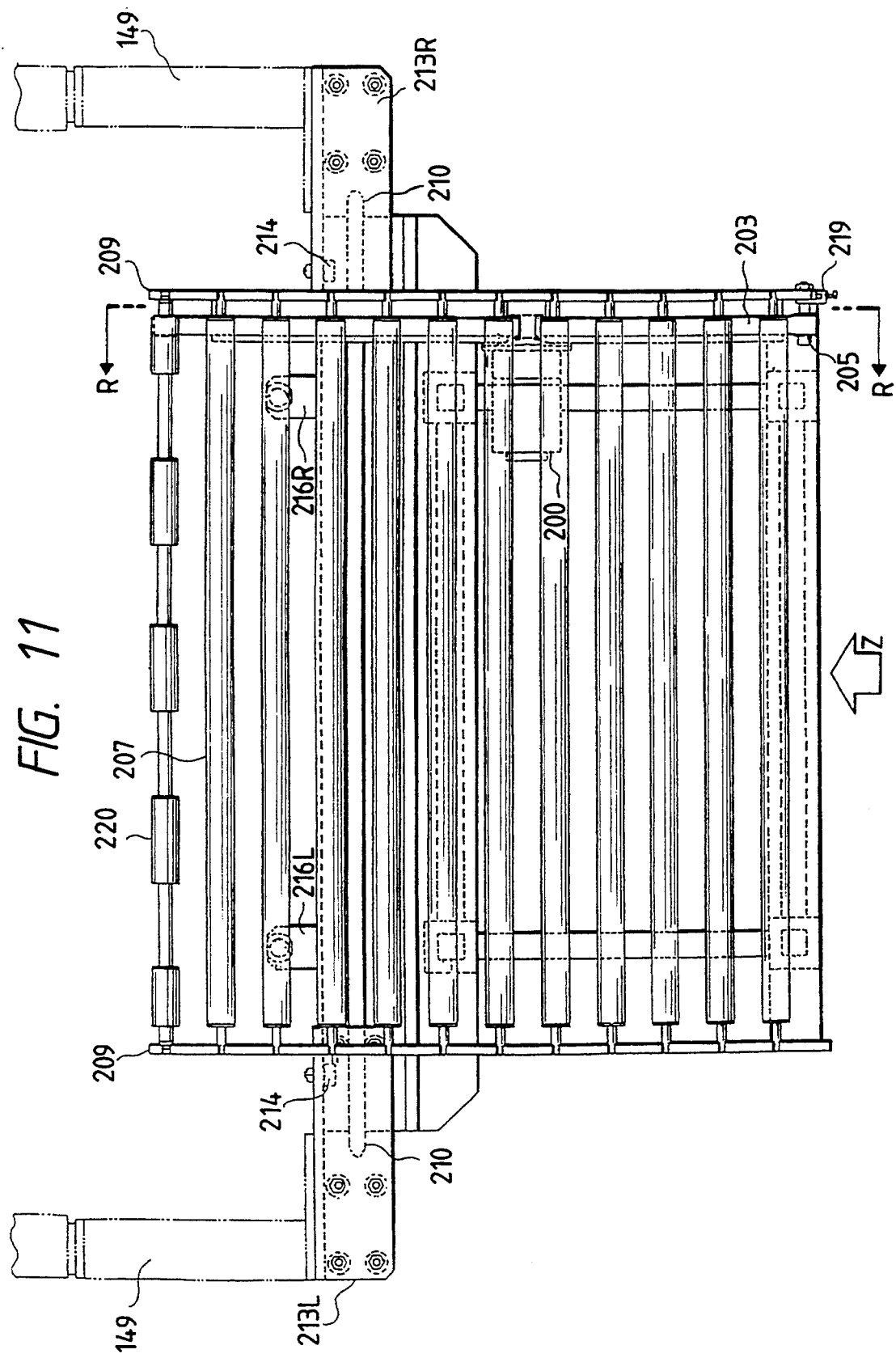

FIGS. 9B and 9C show how some of the poles can be pulled out and swung down so that a preset number of poles, which is appropriate for the length of the base plates being conveyed, are actually used to center the base plates.

When the centering mechanism is put into centering operation so that the centering poles 91L and 91R are moved toward the side edges of the conveyed base plate, the centering of the base plate is performed at a prescribed speed until both the centering inside sensors 98L and 98R detect the side edges of the base plate. The centering drive motor 148 is shifted to change the prescribed speed to a lower speed, after the lapse of the set time of a timer, which is started on the basis of a detection signal from the sensor 98L or 98R. Instead of that, the motor 148 may be temporarily stopped and thereafter rotated at the lower speed. The rotation of the motor 148 at the lower speed is stopped when the side edges of the base plate are detected by both the centering outside sensors 99L and 99R.

The centering operation of the base plate centering mechanism is briefly described below. When the leading edge of the base plate is detected by the centering start sensor 130L or 130R, the centering operation, including the movement of the centering poles 91L and 91R located at both the side edges of the base plate, is started so that the first step of the operation is executed at the prescribed higher speed. In the first step, the centering poles 91L and 91R are moved until the centering inside sensors 98L and 98R detect the left and right side edges of the base plate, so that the poles are stopped. For that reason, one of the centering poles 91 can push the base plate at the side edge thereof, but the poles cannot both push the plate at both of the side edges thereof simultaneously. The centering poles 91L and 91R located at both the side edges of the base plate are thereafter moved at the lower speed toward the center of the width of the conveyance passage for the base plate so that the second step of the centering operation is executed. In the second step, the centering outside sensors 99L and 99R detect the left and right side edges of the base plate so that the base plate centering mechanism is stopped in a position wherein the rotary portions 154 of the centering poles 91L and 91R come into contact with the left and right side edges of the base plate so as not to deform or damage the side edges. Since the rotary portions 154 are smoothly rotated, they do not hinder the conveyance of the base plate.

Figure 4:
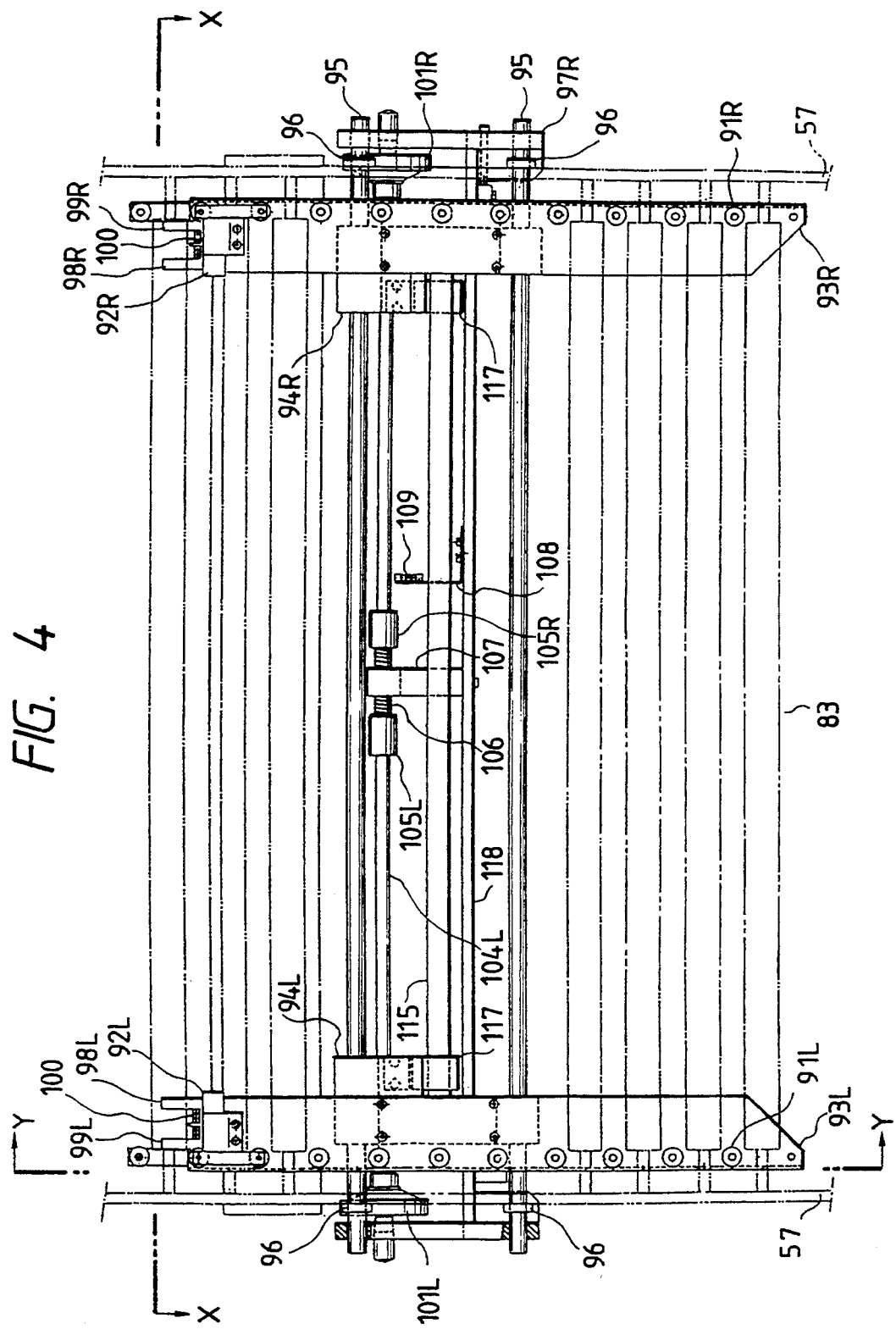
FIG. 4 is a plan view of the centering mechanism.

The center position into which the base plate is placed by the centering operation of the centering mechanism can be shifted by turning a center position setting handle 101L or 101R of the mechanism, which is shown in FIG. 4. The center position is indicated by graduations marked on the center position indicating plate 102 and reflection member attaching plate 88 of the centering mechanism, which are shown in FIG. 1.

The base plate is conveyed at a prescribed speed to the body of the sticking apparatus while the base plate remains centered as described above. When the leading edge of the base plate is then detected by a base plate leading edge sensor 119 supported by attaching plate 120 on attaching cover 122, shown in FIG. 1, the speed is changed for a preset speed which is a base plate insertion speed not equal to the prescribed speed. At that time, the counter (which is not shown in the drawings) of a rotary encoder 62 attached to a rotary encoder attaching member 59 starts counting in order to detect the rotation of a conveyance roller drive motor 50 (see FIG. 3). When the count of the counter is equal to a set value, the rotation of the motor 50 is stopped so that the conveyance of the base plate is ceased to put it in a position wherein the stratified films are tentatively stuck to the base plate at the leading edge thereof.

The right and left body frames 57 of the base plate conveyor have through holes in which bearings 82R and 82L are fitted, as shown in FIG. 8A. The shaft of the conveyance roller 83 is supported by the bearings 82R and 82L. Pulleys 76R and 76L are secured to the shaft at both the right and left ends thereof by screws. Driven roller support members 87R and 87L are secured to the right and left body frames 57 of the conveyor by screws so that the driven roller 84 is located on the top of the conveyance roller 83. Rubber rings 85R and 85L are provided on the driven roller 84 at both the ends thereof. Shaft support members 86R and 86L are provided on the shaft of the driven roller 84 at both the ends of the shaft and attached to the driven roller support members 87R and 87L. The reflection member attaching plate 88 is secured to the tops of the right and left body frames 57 of the conveyor by screws. The centering start sensor reflection members 89R and 89L are secured to the right and left portions of the side of the reflection member attaching plate 88 by screws. A base plate trailing edge sensor reflection member 90 is secured to the central portion of the side of the attaching plate 88 by screws. A motor mounting plate 51 is secured to the lower portion of the right body frame 57 of the conveyor by screws. The conveyance roller drive motor 50 is secured to the mounting plate 51 by screws. A pulley 52 is secured to the shaft of the motor 50 by a screw.

As shown in FIG. 8B, the conveyor body frame 57 has a through hole through which a pulley shaft 79 is secured by a nut. An idle pulley 78 is rotatably supported with a bearing 80 by the pulley shaft 79. An adjusting member 81 is secured to the pulley shaft 79. A screw is fitted in the lower portion of the adjusting member 81 so that when the screw is driven into the member, the pulley shaft 79 is pulled down to adjust the tension of a belt 77 engaged on the idle pulley 78.

The right and left frames 57 of the body of the conveyor have notches N (see FIG. 3) through which the shaft of a holding roller 66 extends. As shown in FIG. 8C, bearings 63R and 63L are mounted on the shaft at both the ends thereof and secured to the outsides of the frames 57. A gear 67A is secured to the shaft at the left end thereof by a screw inside the frame 57. Another gear 65 is secured to the shaft at the right end thereof by a screw inside the frame 57. The pulley 76R' is secured to the shaft at the right end thereof by a screw. A cylinder attaching plate 70 is secured to the tops of the frames 57 by screws. Pneumatic cylinders 72R and 72L are secured downward to the tops of the right and left portions of the cylinder attaching plate 70 by screws.

Holding roller support members 73R and 73L are secured to the tops of the piston rods of the pneumatic cylinders 72R and 72L and fitted with the bearings 75R and 75L. Another holding roller 69 is rotatably supported by the bearings 75R and 75L and located over the former holding roller 66. Shaft stoppers 74R and 74L are secured to the shaft of the holding roller 69 at both the ends thereof by screws. The gear 68A is secured to the shaft of the holding roller 69 at the left end thereof and engaged with the gear 67A. Shaft support members 71R and 71L are provided on the shaft of the holding roller 69 at both the end portions of the shaft, which extend through the notches N of the conveyor body frames 57 so that the holding roller can be vertically moved smoothly in the notches when the cylinders 72R and 72L are operated.

The lower portion of the right frame 57 has a through hole in which a bearing 58 is fitted to support the shaft 56 extending through the hole. Pulleys 54 and 55 are secured to the shaft 56 at the right end thereof by screws. A gear 60 is secured to the shaft 56 at the left end thereof and engaged with a gear 65. The rotary encoder attaching member 59 is secured to the lower portion of the right frame 57 by screws. The rotary encoder 62 is secured to the attaching member 59. A gear 61 is secured to the shaft of the rotary encoder 62 and engaged with the gear 60. The pulleys 52 and 54 are connected to each other by a belt 53. The pulley 76R secured to the conveyance roller 83, the other pulley 76R' secured to the holding roller 66 and the idle pulley 78 are connected to each other by the belt 77. Immediately after the centering operation is completed, the piston rods of the pneumatic cylinders 72L and 72R for the holding roller 69 are protruded so that the holding roller support members 73L and 73R secured to the tops of the piston rods are simultaneously pushed. As shown in FIG. 8C, the shaft of the holding roller 69 is rotatably supported with the bearings 75L and 75R by the holding roller support members 73L and 73R and secured with the shaft stoppers 74L and 74R so as not to deviate either rightward or leftward.

Since the shaft support members 71L and 71R are mounted on the shaft of the holding roller 69 at both the ends thereof so that the members can be optionally moved up and down in the notches N of the frames 57 of the conveyor, the centered base plate can be accurately conveyed without slipping while being pinched between the holding rollers 66 and 69. Since the gears 67A and 68A are provided on the right portions of the holding rollers 66 and 69 as seen in the direction of the conveyance of the base plate or on the left portions of the rollers with regard to FIG. 8C and engaged with each other, motive power is transmitted from the conveyance roller drive motor 50 to the holding rollers 66 and 69 through the pulley 52, the belt 53, the pulley 54, the shaft 56 and the gears 60 and 65 so that the rollers are rotated. Opposite the gear 65, the other gear 60 is engaged with the still other gear 61 secured to the shaft of the rotary encoder 62 secured to the rotary encoder attaching member 59 by the screws. After a time set by a timer has elapsed since the start of the sticking of the already-tentatively-stuck stratified films to the base plate by heat and pressure sticking rollers pressed on the films, the piston rods of the pneumatic cylinders 72 are retracted so that the holding roller 69 is separated from the base plate.

The base plate is conveyed by the base plate conveyor while the stratified films are stuck to the base plate. The trailing edge of the base plate is detected by the base plate trailing edge sensor 129 (see FIG. 7) so that the films are cut off when the base plate is conveyed by a length preset by a counter. The cut-off trailing edges of the films are stuck to the prescribed portions of the surfaces of the base plate at the trailing edge thereof. After the films are thus stuck to the base plate, the base plate is conveyed to the downstream base plate conveyor of the sticking apparatus.

When the base plate is stopped in the position of the tentative sticking of the films thereto, the centering drive motor 148 is rotated reversely to its rotation for the centering of the base plate so that the centering poles 91L and 91R are returned to the original positions thereof in preparation of the next centering. The motor 148 is thereafter stopped.

A centering limit sensor 109, shown in FIG. 5, is a stop sensor for determining the limit position to the movement of the base plate toward the center of the width of the plate during the centering thereof. The other centering limit sensor 111 is a stop sensor for determining the original position of the centering mechanism for the centering operation thereof. The limit sensors 109 and 111 are attached to support member 18 by attaching members 108 and 110, respectively. Element 112 is a light blocking plate.

Wetting rollers 125 and 126, shown in FIG. 7, are for causing water, as an air bubble preventing agent, to cling to the base plate being conveyed. Since the wetting rollers 125 and 126 are the same as those disclosed in the Japanese Patent Application (OPI) No. 160084/89, they are not described in detail herein.

Work, such as changing film rolls, is often done on the sticking apparatus. Every time the work is done, the inlet or upstream base plate conveyor needs to be moved rightward or leftward. For this reasons, the base plate conveyor is provided with a mechanism which makes it possible for the conveyor to be slid either rightward or leftward without using a guide rail at the front of the body of the sticking apparatus and is easily separated from the body of the apparatus. The mechanism is described below.

Figure 3:
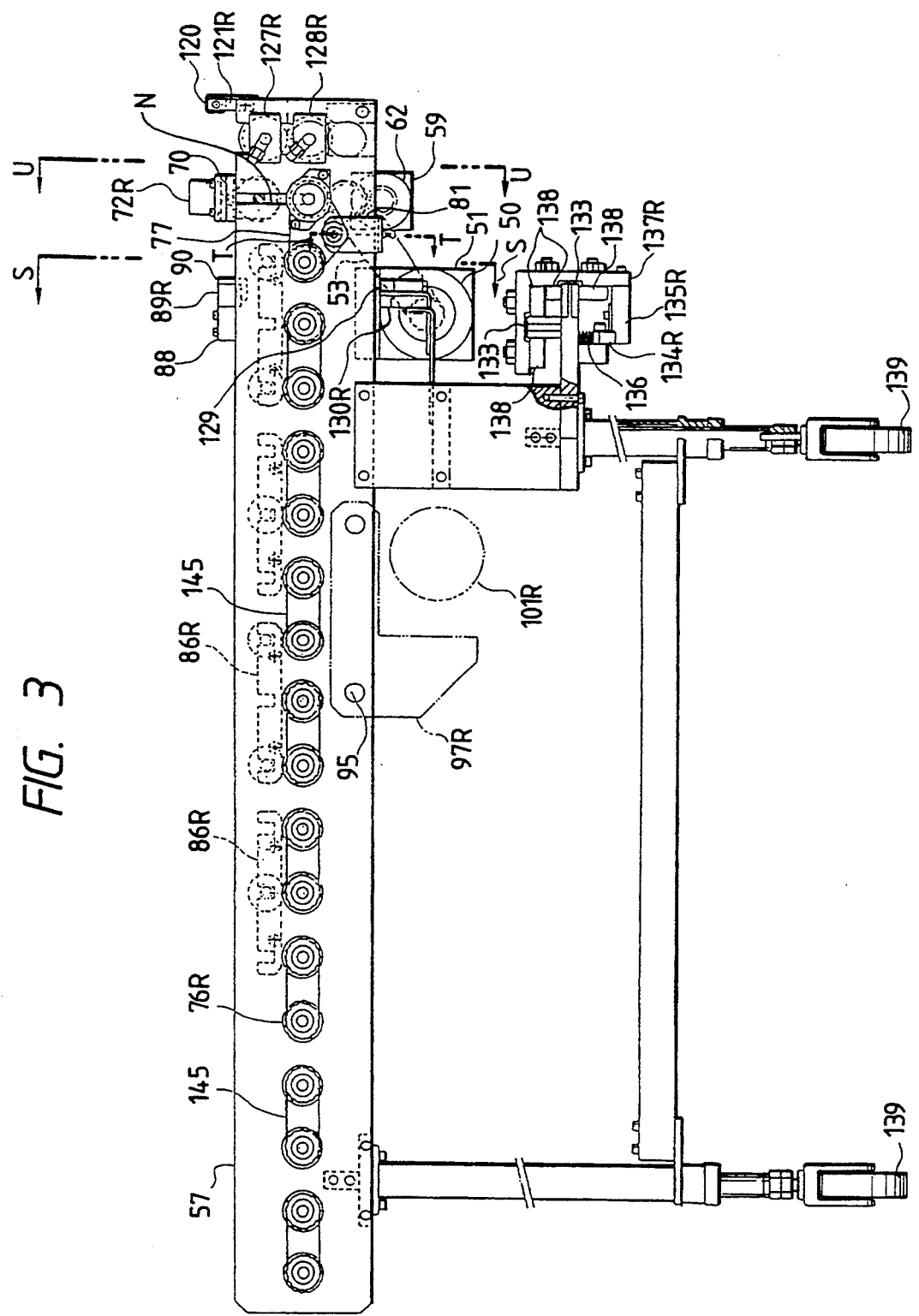
FIG. 3 is a side view of the conveyor seen along an arrow R shown in FIG. 2.

Slide bases 137L and 137R are secured to the frame 149 (see FIG. 1) of the sticking apparatus by screws. A guide plate 133 is secured to the body of the base plate conveyor by screws so as to extend vertically and horizontally. As shown in FIGS. 1, 3 and 7, cam followers 138 are secured to the slide bases 137L and 137R at the left and right portions thereof so as to guide the guide plate 133 extending vertically and horizontally. Hooks 134L and 134r, each of which is secured at one end thereof by a screw so as to be vertically movable at the other end thereof, are provided near the left and right lower portions of the guide plate 133. Springs 136 for the hooks 134L and 134R are provided between the guide plate 133 and the hooks. Positioning members 135L and 135R, with which the hooks 134L and 134R are engaged, are secured to the slide bases 137L and 137R by screws.

When the base plate conveyor is set in the body of the sticking apparatus, the left and right hooks 134L and 134R of the conveyor are put in normal positions by the positioning members 135L and 135R on the body of the apparatus so that the films cannot be stuck to the base plate by the apparatus until the normal position sensors 146 detect the detection plates 147. When the base plate conveyor is to be moved rightward, for example, the conveyor is pushed rightward while the left hook 134L is pushed up by a finger, so that the guide plate 133 of the conveyor is moved rightward while being guided by the cam follower 138 on the slide base 137R. When the base plate conveyor is pushed rightward further after the finger is released from the left hook 134L, the hook is engaged with the right positioning member 135R so that the conveyor is stopped. When the base plate conveyor is pushed rightward again while the hook 134L is pushed up by the finger, the conveyor is separated from the body of the sticking apparatus. The hooks 134L and 134R are designed to be engaged with the positioning members 135L and 135R from inside. The mechanism may be otherwise designed so that the hook 134L is disengaged from the positioning member 135L and the base plate conveyor is pulled toward the hook so as to be slid to be separated from the body of the sticking apparatus, for example. Since the base plate conveyor can be moved either rightward or leftward and separated from the body of the sticking apparatus, it is very easy to perform the maintenance on the body of the apparatus and it is easy to change the layout or the like of the body in a factory or the like.

An example of how the downstream base plate conveyor of the sticking apparatus 149 can be moved either rightward or leftward and separated from the body of the apparatus is described below with reference to FIGS. 10, 11, 12 and 13. Shown in the drawings are a drive motor 200 for conveyance rollers 207, a motor mounting plate 201, a pulley 202, a belt 203, pulleys 204, tension pulleys 205, guides 206 for the belt, the conveyance rollers 207, driven rollers 208, the frame 209 of the body of the conveyor, a guide plate 210, hooks 211, positioning members 212, slide bases 213, cam followers 214, casters 215, an auxiliary caster 216, a normal position setting sensor 217, a detection plate 218, a tension adjusting member 219, and conveyance rubber rollers 220. The casters 215 are screw-engaged in the legs of the body frame 209 of the downstream base plate conveyor and secured thereto by nuts. The auxiliary caster 216 is attached to the other leg of the body frame 209. The right and left side plates of the upper portion of the body frame 209 have slits symmetrically disposed to each other.

Figure 12:
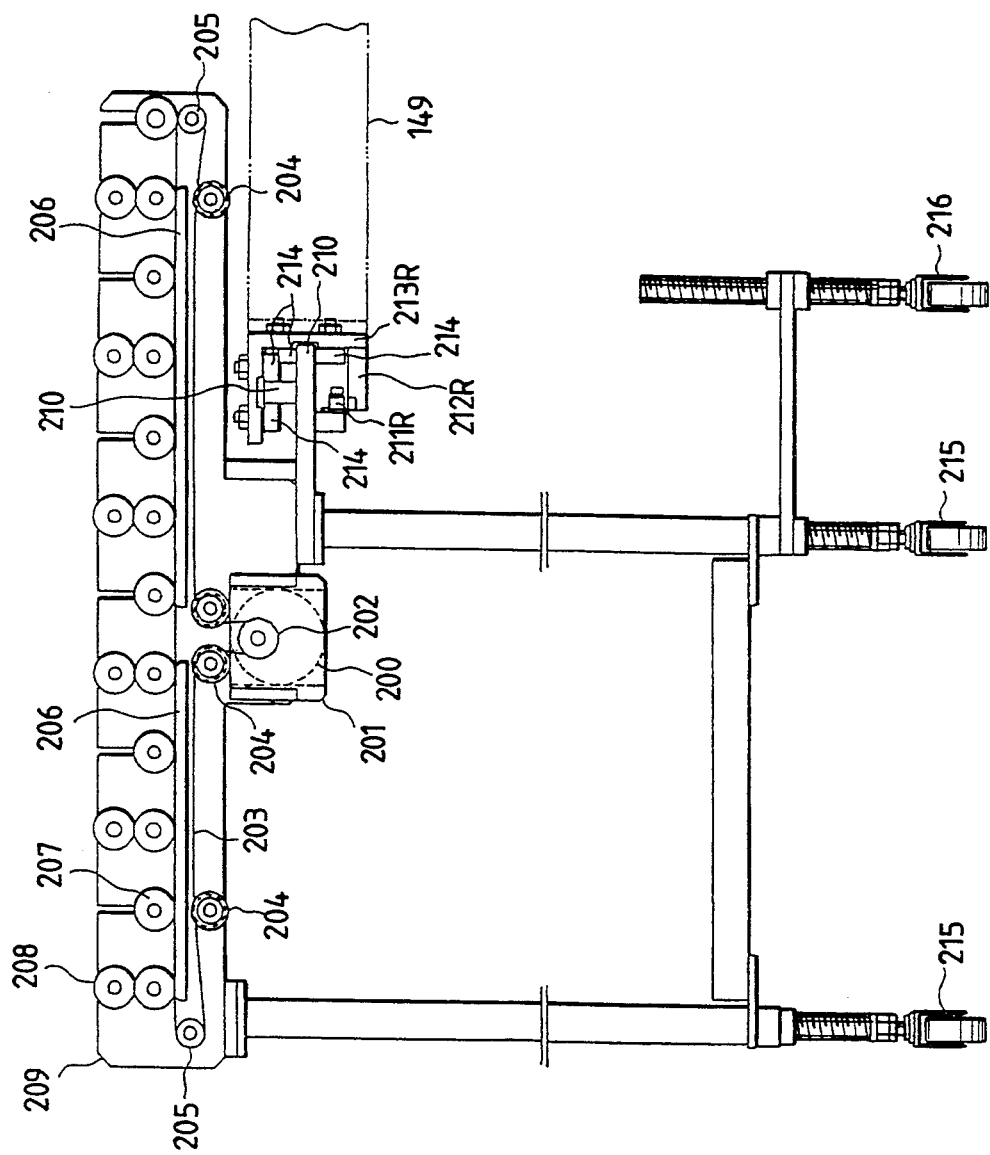
Figure 13:
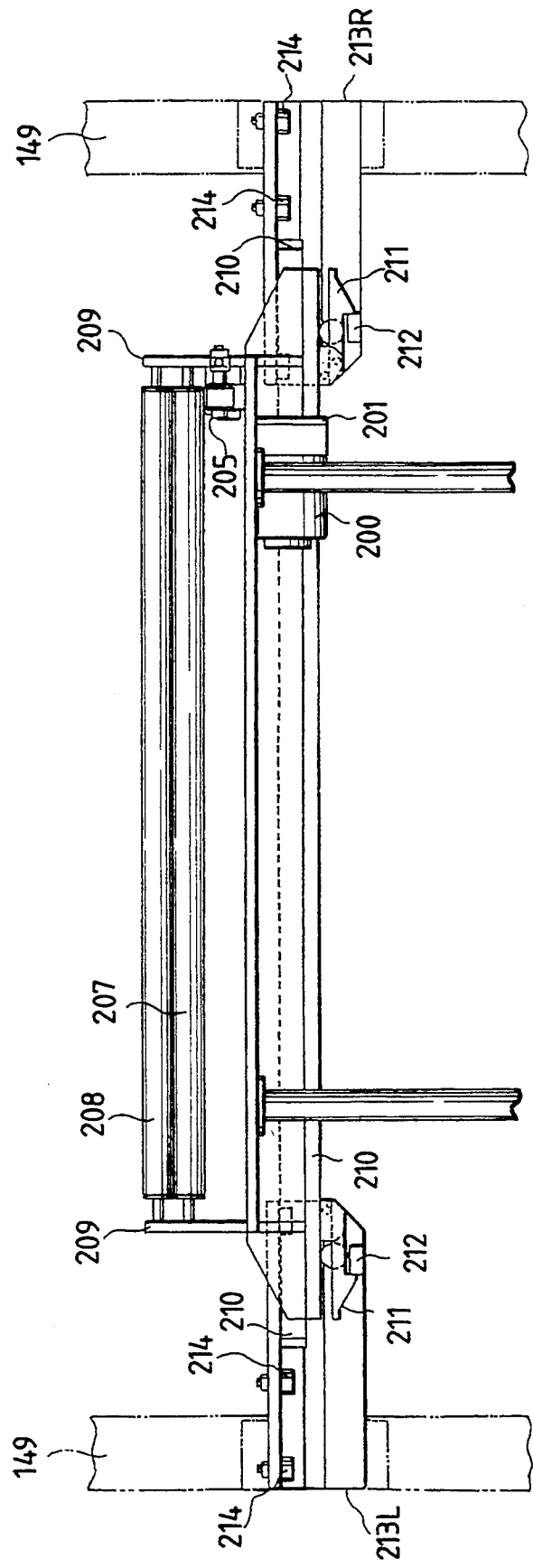

As shown in FIG. 12, the guides 206 for the belt 203 are secured to the frame 209 by screws under the slits of the right side plate of the upper portion of the frame. The motor mounting plate 201 is secured to the frame 209 by screws under the guides 206. The drive motor 200 is secured to the mounting plate 201 by screws. The pulley 202 is secured to the shaft of the motor 200. The shafts of two of the pulleys 204 are screw-engaged in and secured by nuts between the motor 200 and the guides 206 at the right side plate of the upper portion of the frame 209. The bodies of the pulleys 204 are rotatably fitted on the shaft thereof. The other two of the pulleys 204 are provided at the upstream and downstream ends of the frame 209. The tension pulleys 205 are provided near the guides 206 at the right side plate of the upper portion of the frame 209. The belt 203 partly extends on the tops of the belt guides 206 and is engaged on the tension pulleys 205, the pulleys 204 and the pulley 202 so that the belt is revolved when the motor 200 is rotated. The shafts of the conveyance rollers 207 are fitted in the slits of the right and left side plates of the upper portions the frame 209. The shaft of the conveyance rubber rollers 220 is fitted in the slits of the right and left side plates, which are located nearest the body of the sticking apparatus. The bodies of the conveyance rollers 207 and those of the conveyance rubber rollers 220 are located on the top of the belt 203 so that the rollers are rotated when the belt 203 is revolved.

The slide bases 213R and 213L are secured to the body frame 149 of the sticking apparatus at the right and left ends of the frame by screws. The guide plate 210 is secured to the body frame 209 of the downstream base plate conveyor so as to extend vertically and horizontally. The plural cam followers 214 are provided on the slide bases 213R and 213L to guide the vertically and horizontally extending guide plate 210 on both the sides thereof. The positioning members 212 are secured to the lower portions of the slide base 213R and 213L by screws. The hooks 211, each of which is supported at one end thereof with a screw so as to be vertically movable, are provided near and under the right and left portions of the guide plates 210 so that the hooks are engaged with the positioning members 212 when the downstream base plate conveyor is set in the body of the sticking apparatus (see FIG. 13). When the conveyor is to be slid or separated from the body of the apparatus, the conveyor is pushed rightward or leftward while the left or right hook 211 is pushed up with a finger. The conveyor can thus be easily slid or separated from the body of the apparatus.

As described above with reference to FIGS. 10, 11, 12 and 13, the downstream base plate conveyor can be moved rightward and leftward and separated from the body of the sticking apparatus as well as the upstream base plate conveyor so as to produce the same effect as the latter.

Figure 14:
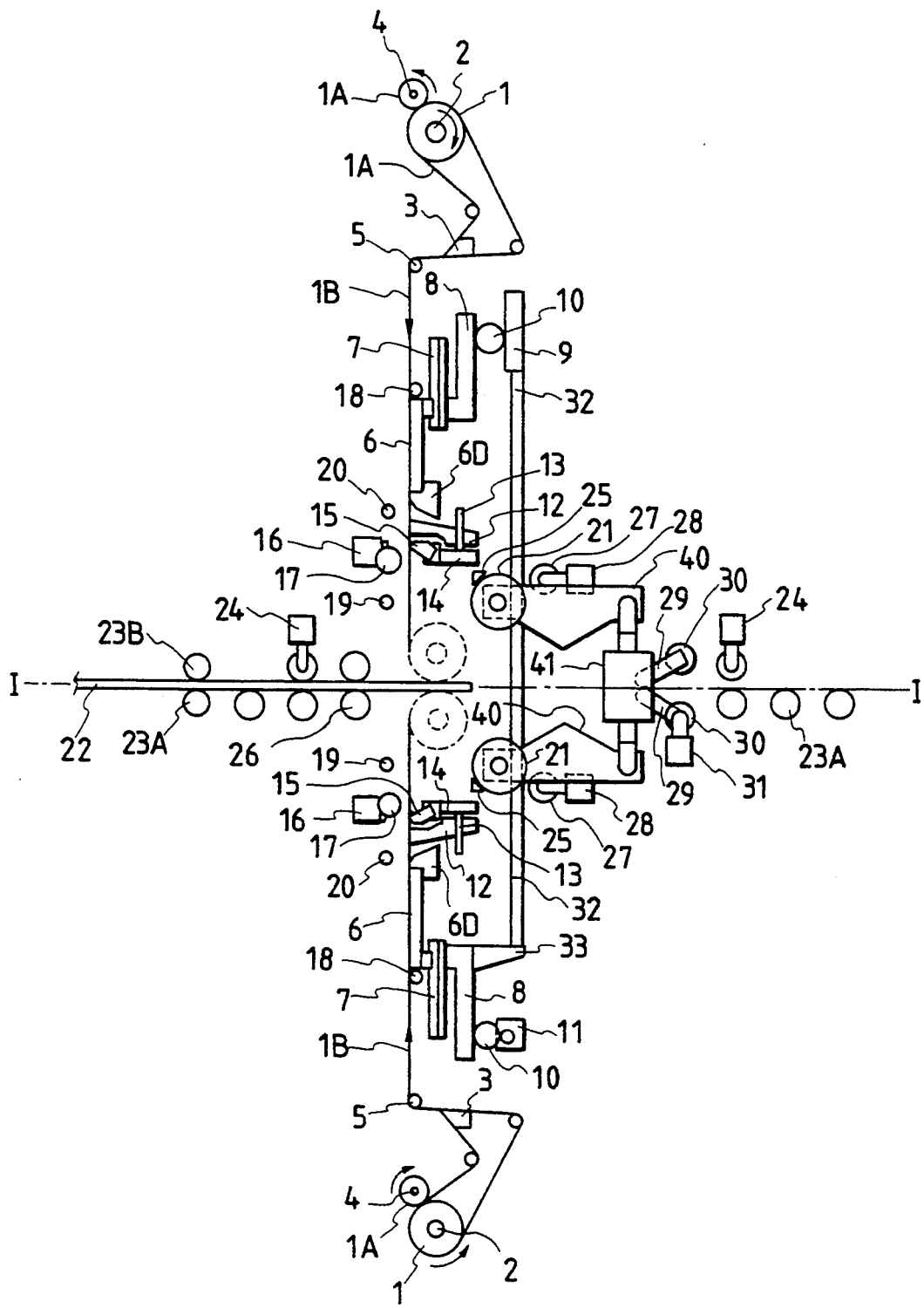
FIG. 14 is a side view of the sticking apparatus and is also an explanatory view for describing the feed of stratified films.

FIG. 14 is a side view of the sticking apparatus and is also an explanatory view for describing the feed of stratified films. In the sticking apparatus, the three-layer stratified films 1 each consisting of the light-transmissible resin film, the photosensitive resin layer and another light-transmissible resin film are continuously wound on supply rollers 2 in advance. The stratified film 1 from each of the supply rollers 2 is separated, by a film separation member 3, into the light-transmissible resin film 1A (which is a protective film) and the stratified film 1B consisting of the photosensitive resin layer and the other light-transmissible resin film. The separated light-transmissible resin film 1A is wound on a winding roller 4. A pair of such winding rollers 4 are provided over and under the conveyance passage I—I for the base plate as well as the supply rollers 2.

The leading edge of the separated stratified film 1B is fed to a main vacuum suction plate 6 (which is a film feed member) along a tension roller 5, as shown in FIG. 14. The plate 6 has a leading end portion 6D. A static electricity eliminator 18 for the film 1B is provided near the suction plate 6. As shown in FIG. 14, the plate 6 is provided to be vertically moved toward and away from the position of the sticking of the film 1B to the base plate. The main vacuum suction plate 6 is slidably fitted on guide rails attached to a support plate 8 for the suction plate. The support plate 8 is coupled with a rack (which is not shown in the drawings) and a gear 10 to a mounting frame attached to the body of the sticking apparatus, so that the support plate can be vertically moved. The gear 10 is engaged with a rack 9 provided on a coupling rod 32 which is for the support plates for the upper and the lower main vacuum suction plates and is connected to a drive motor 11. A film holding member 12 for winding the leading edge portion of the stratified film 1B is slidably fitted on horizontal guide rails on the support plate 8 for the main vacuum suction plate 6, and provided with a coupling notched member in which a coupling rod 13 is fitted. The coupling rod 13 is attached to a support member 14 which supports a fixed cutting member 15. A rotary cutting member 17 is rotatably supported by a support member 16. The cutting edge of the rotary cutting member 17 extends obliquely at a prescribed angle. Air blowoff pipes 19 and 20 for blowing air to the stratified film 1B are provided over and under the support member 16 for the rotary cutting member.

FIG. 14 also shows the pressure sticking rollers 21, the base plate 22, driving rollers 23A, driven rollers 23B, base plate holders 24, each of which includes a base plate holding roller and a pneumatic cylinder for vertically moving the roller, vacuum suction bars 25, the wetting rollers 26, pressure sticking roller wiping rollers 27, pneumatic cylinders 28 for the wiping rollers, wiping roller kinematic coupling and holding members 29, base plate wiping rollers 30, pneumatic cylinders 31 for the base plate wiping rollers, coupling rod attaching member 33, pressure roller support members 40, and pneumatic cylinders 41 for vertically moving the pressure sticking rollers.

When the stratified films 1B are to be stuck to the base plate 22 by the sticking apparatus, the films are fed along the direction of the conveyance of the base plate 22 between the upper and the lower pressure sticking rollers 21, the base plate is conveyed in between the mutually-facing sides to be stuck (which are the separated sides) of the films, the sticking rollers are put into pressure contact with the films on the base plate, and the base plate is conveyed through and between the rollers. The films 1B are thus stuck to both the sides of the base plate 22.

The present invention is not confined to the embodiment described above, but may be embodied or practiced in other various ways without departing from the spirit or essential character thereof.

According to the present invention, a right and a left centerers are moved, by a base plate centerer moving means, at a prescribed speed to such positions that the distance between both the centerers is slightly larger than the width of a conveyed base plate. The centerers are thereafter moved again, by the means, at a speed lower than the former speed. For these reasons, the base plate is prevented from being curved or damaged at the side edges thereof, due to the pushing of the side edges by the centerers. Since a guide member for restricting the warpage of the base plate is provided over the conveyance rollers, the base plate can be precisely and easily centered, almost without any warping. Since the poles of the centerers are rotatably supported, the base plate can be centered without stopping the conveyance thereof. Since the poles can be swung down, a number of the poles, which is appropriate to the length of the base plate, can be used for the centering of the base plate. For that reason, the interval between the base plates in the direction of the conveyance thereof can be shortened to enhance the efficiency of production.

What is claimed is:

1. A base plate conveyor comprising conveyance rollers for conveying a base plate to a first position; a base plate centering mechanism having a right and left centerer for centering said base plate on said base plate conveyor; a base plate centerer moving means for moving at least one of said right and left centerers of said centering mechanism at a prescribed speed in a direction transverse to that of the conveyance of said base plate, said base plate centerer moving means moving at least one of said right and left centerers at said prescribed speed to a second position such that the distance between said right and left centerers is slightly larger than a width of said base plate, wherein said base plate centerer moving means thereafter moves at least one of said right and left centerers toward said base plate at a speed lower than said prescribed speed, such that said base plate is centered; and a guide member for restricting the warpage of the base plate during centering thereof.

2. The base plate conveyor according to claim 1, wherein said guide member comprises at least two rollers for restricting warpage of the base plate.

3. The base plate conveyer according to claim 1, further comprising at least one sensor disposed proximate to the moving base plate and said right and left centerers, and detecting when at least one of said right and left centerers reaches said second position.

4. The base plate conveyer according to claim 3, wherein said base plate centerer moving means comprises means responsive to said sensor for adjusting the speed of said right and left centerers.

5. A base plate conveyor comprising conveyance rollers for conveying a base plate to a first position; a base plate centering mechanism having a right and left centerer for centering said base plate on said base plate conveyor, wherein at least one of said right and left centerers comprises a plurality of individual members; and a base plate centerer moving means for moving at least one of said right and left centerers of said centering mechanism at a prescribed speed in a direction transverse to that of the conveyance of said base plate, said base plate centerer moving means moving at least one of said right and left centerers at said prescribed speed to a second position such that the distance between said right and left centerers is slightly larger than a width of said base plate, wherein said base plate centerer moving means thereafter moves at least one of said right and left centerers toward said base plate at a speed lower than said prescribed speed, such that said base plate is centered.

6. The base plate conveyer according to claim 5, further comprising a means for selecting a preset number of said individual members for use in centering said base plate.

7. The base plate conveyer according to claim 6, wherein said means for selecting selects a preset number corresponding to a length of said base plate.

8. The base plate conveyer according to claim 5, wherein said individual members are rotatable.

9. The base plate conveyer according to claim 5, further comprising at least one sensor disposed proximate to the moving base plate and said right and left centerers, and detecting when at least one of said right and left centerers reaches said second position.

10. The base plate conveyer according to claim 9, wherein said base plate centerer moving means comprises means responsive to said sensor for adjusting the speed of said right and left centerers.

11. In combination with a sticking apparatus for sticking a film to a base plate; a conveyer, said base plate being conveyed to said sticking apparatus by said conveyer; said conveyer comprising:

conveyance rollers for conveying said base plate to a prescribed position; a base plate centering mechanism having a right and left centerer for centering said base plate on said base plate conveyor, wherein at least one of said right and left centerers comprises a plurality of individual members; and a base plate centerer moving means for moving at least one of said right and left centerers of said centering mechanism at a prescribed speed in a direction transverse to that of the conveyance of said base plate, said base plate centerer moving means moving at least one of said right and left centerers at said prescribed speed to such a position that the distance between said right and left centerers is slightly larger than a width of said base plate, wherein said base plate centerer moving means thereafter moves at least one of said right and left centerers toward said base plate at a speed lower than said prescribed speed, such that said base plate is centered.

12. The base plate conveyer according to claim 11, further comprising a means for selecting a preset number of said individual members for use in centering said base plate.

13. The base plate conveyer according to claim 12, wherein said means for selecting selects a preset number corresponding to a length of said base plate.

14. The base plate conveyer according to claim 11, wherein said individual members are rotatable.

15. The base plate conveyer according to claim 11, further comprising at least one sensor disposed proximate to the moving base plate and said right and left centerers, and detecting when at least one of said right and left centerers reaches said second position.

16. The base plate conveyer according to claim 15, wherein said base plate centerer moving means comprises means responsive to said sensor for adjusting the speed of said right and left centerers.

* * * * *